United States Patent [19]

Gillot et al.

[11] 4,237,107

[45] Dec. 2, 1980

[54] CELLULAR CARBON BEADS AND PROCESS FOR FABRICATION

[75] Inventors: Jacques Gillot, Grand-Lancy; Stuart F. Exell, Geneva; Benno Lux, Veyrier, all of Switzerland

[73] Assignee: Battelle Memorial Institute, Switzerland

[21] Appl. No.: 917,582

[22] Filed: Jun. 21, 1978

Related U.S. Application Data

[60] Continuation of Ser. No. 728,406, Sep. 30, 1976, abandoned, which is a division of Ser. No. 453,083, Mar. 20, 1974, abandoned.

[30] Foreign Application Priority Data

Mar. 20, 1973 [CH] Switzerland ..................... 4071/73
Mar. 20, 1973 [CH] Switzerland ..................... 4072/73

[51] Int. Cl.$^3$ ................... C01B 31/00; C01B 31/02
[52] U.S. Cl. ................... 423/445; 264/29.1; 264/51; 423/449

[58] Field of Search .............. 423/445, 449; 264/29.1, 264/53, 54, 51; 106/307; 260/2.5 B; 428/539.5; 521/56

[56] References Cited

U.S. PATENT DOCUMENTS

| | | | |
|---|---|---|---|
| 3,651,182 | 3/1972 | Rosenthal | 264/51 |
| 3,786,134 | 1/1974 | Amagi et al. | 423/449 |
| 3,830,903 | 8/1974 | Bobinsky et al. | 423/449 |
| 3,832,426 | 8/1974 | Malthouse et al. | 264/29.1 |
| 3,902,861 | 9/1975 | Gillot et al. | 428/539.5 |

FOREIGN PATENT DOCUMENTS

1963325 9/1970 Fed. Rep. of Germany .......... 423/445

*Primary Examiner*—Edward J. Meros
*Attorney, Agent, or Firm*—Robert E. Burns; Emmanuel J. Lobato; Bruce L. Adams

[57] ABSTRACT

This invention concerns a cellular, spherical bead of organic, macromolecular polymer material which when carbonized in the solid state retains its original beaded shape and has a high carbon content and methods for making such beads of polymer and carbon.

10 Claims, No Drawings

CELLULAR CARBON BEADS AND PROCESS FOR FABRICATION

This is a continuation of application Ser. No. 728,406, filed Sept. 30, 1976, which is a divisional of parent, Ser. No. 453,083 filed Mar. 20, 1974, both abandoned.

FIELD OF THE INVENTION

This invention concerns a cellular, spherical carbon bead and methods for making such beads of polymer and carbon.

THE INVENTION

This bead is characterized by the fact that it is composed of a plurality of closed cells and that the walls of the peripheral cells form a skin marking the limits of the external surface.

The dimensions of the bead concerned in this invention can be varied, its average diameter lying, by preference, in the range of several tenths of a millimeter up to several centimeters, and the thickness of its skin, which is a function of the bead dimensions, being, by preference, in the range of about 50 to 500 microns.

One particularly interesting form of the beads, which comprise this invention, are that each has a central part, made up of cells having approximately constant dimensions, surrounded by a peripheral part or skin in which the dimensions of the cells, as well as the volume which they occupy, progressively decreases from the inside to the outside of the bead.

By preference, the ratio of the average cell diameter to the average bead diameter lies in the range 0.001 to 0.25. Likewise, by preference, the ratio of the average cell wall thickness to the average cell diameter lies in the range 0.0016 to 0.25. The ratio of average wall thickness to the average cell diameter, by preference lies between 0.001 to 0.15.

The beads according to this invention can be used either in their own right or as a starting material for numerous industrial applications.

For example a layer of beads can be used to cover the surface of a chemical-containing bath in order to prevent contact between the chemical and the atmosphere, for example in situations when the bath contains products which are volatile, toxic, inflammable or liable to be affected by direct contact with the atmosphere.

The use of macromolecular or polymeric organic materials in the form of cellular beads is already known for this purpose, but cellular beads of carbon according to this invention have the advantage of being inert, especially in the case of high temperature conditions.

The carbon beads concerned in this invention can also be used to form inert filtration beds for the separation of solids from liquids and/or gases, this use having clear advantages when the products corrode materials other than carbon.

Among these applications can be mentioned the fabrication of light, mechanical components, of parts for damping vibrations and for absorbing shock impacts, of high temperature filters, of mixers for combining combustible gases or liquids to be used in burners, of supports for catalytically active materials for chemical and physicochemical reactions etc.

Moreover, these beads can be used to manufacture composite materials, formed, for example, of a synthetic resin inorganic or metallic matrix, containing spherical cellular carbon beads, of suitable dimensions, which conform with the present invention, such materials having novel combinations of physicochemical and mechanical properties which can be modified over a large range, thus enabling many applications.

In all of these uses, the fact that the beads of carbon are spherical, facilitates easy usage, and the fact that they are cellular means that they have a low density, which enables the production of materials or mechanical components which are light. The existence of the surrounding denser surface layer ("Skin") described above enables the formation of composite materials by casting liquid substances into a closed mould containing the beads which are the subject of this invention, without these liquids penetrating into the interior pores of the beads.

The invention also concerns the process for manufacturing the sperical beads of carbon which have just been described.

DETAILED DESCRIPTION OF THE INVENTION

This process is characterized by the fact that a mixture is prepared which comprises (1) at least one, organic macromolecular, precursor material, which is expanded and hardened to form beads and which when carbonised in the solid state retains its original shape and (2) at least one expansion agent for such precursor material. This mixture is sub-divided into particles. These particles are separated one from the other and maintained separate while they are expanded to a cellular form.

The expanded cellular particles are then hardened while still being separated. The resultant macromolecular beads according to this invention are then carbonised to form the cellular carbon beads according to this invention.

By preference, the organic macromolecular precursor material used, which can be carbonised in the solid state, is a material having a carbonisation residue of at least 15% by weight of its original mass. In particular, it is possible to use a thermosetting resin or a precursor therefor, for example a phenoplast, an aminoplast, a non-saturated polyester, an alkyd resin, a reticulated polyurethane, a polymer of furfuryl alcohol, a mixture of these two latter polymers, an epoxide resin, an aromatic polyamide resin, a polyimide resin, a polysulfone, a phenylene polysulfide etc.

A precursor for such a resin is understood to be a monomer or a prepolymer, possibly mixed with at least one polymerisation catalyst for the resin.

By preference the thermosetting resin precursor used is a phenolformaldehyde resin in the resol stage, that is to say the product of the first stage of condensation of phenol and formaldehyde, in a respective molar ratio of between, by preference, 0.8:1 and 3:1, in the presence of an alkaline polymerisation catalyst, while being slightly heated. It is equally possible to use a phenol-formaldehyde resin of the novolak type, that is to say the product of the first stage of condensation of phenol and formaldehyde in the presence of an acid catalyst. It is also possible to use other phenoplast resins, for example cresol-formol, phenol-furfural, phenol-acetaldehyde, phenol-benzaldehyde, phenolacrolein, etc., or even an aminoplast resin such as urea-formaldehyde, melamine-formaldehyde, etc., or a non-saturated polyester based resin reticulated by triallylcyanurate, etc.

It is equally possible to use as a precursor resin a mixture of at least one polyol of polyester or polyether, at least one catalyst, at least one surface active agent, of water and/or of at least one expansion agent and at least one organic diisocyanate, these ingredients being in proportions suitable to give a rigid foam of polyurethane.

As an expansion agent it is possible to use, for example, a volatile compound, or a mixture of several volatile compounds, such as fluorocarbon compounds, for example trichlorofluoromethane, an aliphatic alcohol of low molecular weight, among others methanol and ethanol; petroleum ether, etc., or a mixture of substances which react together to liberate a gas on being heated, or a substance which decomposes upon heating to liberate a gas.

By preference at least one surface active agent is also introduced to the mixture in order to prevent coalescence of the cells during the expansion of the beads while the mixture is still unhardened.

By preference at least one hardening catalyst for the resin is also added to the mixture, for example an acid such as hydrochloric acid, sulphuric acid, phosphoric acid, para-toluene-sulphonic acid, etc.

In addition to the ingredients indicated above, it is also possible to add to the mixture powdered, inert substances which act as a filler, for example powdered silica, carbon black etc.

The beads of this invention are formed into spherical shape by the thermally initiated expansion of droplets of the precursor thermoplastic resin in liquid or semi-liquid state, by the expansion agent. The expansion takes place in and on a fluid medium comprising gases, liquids or solid particles which surround and or support the droplets during expansion and maintain each droplet in a discrete state to prevent coalescence.

According to a first alternative method of proceeding, droplets of the paste-like mixture are formed and released by a known technique at the top of a tower. These droplets are heated by heating means during their fall down the tower in such a way that they expand to form spherical beads. The rate of fall and the heating conditions during the fall being controlled by said heating means, to assure that the spherical beads which result are sufficiently hard when they reach the bottom of the tower that they do not deform or stick together.

The speed of fall of the droplets can be controlled by means of a rising current of gas, for example a current of air. This gas may serve as a heating medium. This gas stream can also carry particles of a finely divided material, for example talcum powder, carbon black, etc. which can coat, at least partially, the surface of the spherical beads while still viscous, during their expansion in order to prevent their sticking either together or to the walls of the tower.

More generally, it is possible to form droplets of the paste-like mixture in all suitable forms of container, to project or entrain these droplets in such a way as to give them a suitable motion downwards, upwards, turbulent, etc., in this container, possibly by means of a gas current, relatively fast, containing or not containing particles of a solid material, this movement preventing the droplets from contacting one another or the walls of the container or more or less causing the contact time to be very small, while at the same time giving the droplets a suitable treatment with the intention of causing their expansion to cellular, spherical beads. A possible method, among others, of performing these operations is by means of a so-called "cyclone" device, in a container provided with one or several agitating propellers, etc. It is possible to expand the particles to a cellular form at either elevated pressure, atmospheric pressure or at a reduced pressure, for example between 10 and 100 millimeters of mercury.

The thermal treatment entails, in general, heating with the effect of simultaneously (a) causing polymerisation of the resin, or the termination of this polymerisation and (b) the formation and/or expansion of a gas inside the droplets.

To perform this heat initiated treatment, it is possible to use all suitable heating means and methods, for example dielectric heating by means of a microwave generator, radiation heating or even to use the gas stream, itself heated to transfer heat to the droplets. It is possible to combine several of these heating methods, for example by first heating the droplets using microwave energy at the start of their movement in the container, so as to cause their rapid, for example within several seconds, expansion to cellular, spherical beads, then on heating, by means of a hot gas stream to complete the resin polymerisation and to harden the beads.

According to a second alternative method of proceeding, the subdivided particles of the paste-like mix are dropped into a bed containing at least one inert powdered substance such that the particles do not touch one another, then they are given a heat treatment both to provoke their expansion to cellular beads and then to harden the beads so produced.

As an inert powdered substance, it is possible to use a mineral substance, for example, talcum, carbon black, graphite, etc., or organic material, for example an organic resin such as a phenoplast resin, etc. or mixtures thereof. This material is, by preference, in the form of very fine particles having for example a granulometry in the range and of the order of 0.1 to 100 microns.

As a bed of powdered material it is possible to use a fixed bed, having a thickness chosen as a function of the dimensions of the spherical beads required, but not exceeding, by preference, several millimeters, or a "vibrated" bed, that is to say a bed of powdered substance of which the particles are subjected to a vibration. In this latter case it is possible for example, to use a bed of powdered material placed on a tray excited by a suitable means, being, for example, a motor fixed to the tray by an eccentrically placed shaft, to give a circular vibratory motion in a horizontal sense with an amplitude of a few millimeters and a frequency between, for example 53 and 100 Hertz. More generally, it is possible to use a bed of powdered material which is subjected to a more energetic agitation than simple vibration, for example, a bed agitated by helices, a fluidised bed etc.

According to a third alternative method, subdivided particles of the mixture in liquid semi-liquid or solid form are introduced into a liquid, which is inert to, immiscible with and/or does not wet the subdivided particles. Preferably the density of the liquid should be less than the density of the particles of the mixture so that the particle of the mixture when introduced will not be buoyant therein and will be below the surface of the liquid. The liquid is agitated to maintain the particles in suspension and is heated to render the subdivided particles into liquid and/or semi-liquid state and to initiate expansion of the liquidfied particles into spherical beads. As these beads are separated but not wetted by the liquid medium, each particle expands fully in the liquid medium but cannot coalesce with adjoining particles. As the expansion is completed, the thermosetting polymerisation and hardening reactions take place and each spherical bead floats to the top of the liquid medium as a result of the expansion-induced buoyancy and the discrete spherical beads are skimmed from the top of the liquid.

Heating of the liquid can be achieved in stages by the interposition of subsurface dams or partitions to section the container for the liquid. The section where the expansion takes place is maintained at lower temperatures than the polymerisation sections to prevent premature polymerisation and hardening before full expansion.

The particles of the mixture introduced into the liquid may be formed by any of the subdivision methods set forth herein.

Suitable liquid media will vary depending on each of the thermosetting resins used, the nature of the expansion agent, and the temperature required for initiation of the expansion and polymerisation reactions. The liquid media must be inert to the mixture and unwetted or immiscible therewith. For certain of the resins, liquid hydrocarbon fractions such as kerosene and light mineral oil can comprise the major fluid portion of the liquid medium. For other resins aqueous media will serve. The non-wetting properties of the medium with respect to the mixture can be adjusted by the use of silicone oils or by the suspension in the liquid of finely powdered talc or carbon or the other powdered materials used in the second alternative method. Carbon or graphite is preferred as the spherical beads are ultimately to be carbonised.

To form particles of the precursor mixture it is possible to form droplets of the mixture while it is in a liquid or pasty state, or to pass via a stage in which the mixture is temporarily in a solid state.

In the first alternative method case, it is possible to use a subdividing device for the mixture including at least one nozzle of dimensions corresponding to those of the droplets which are required and through which the mixture flows or is extruded depending on its viscosity. This device can be a container either having nozzles in the form of hollow needles, or having a base which has at least partially the form of a plate pierced by several holes, this plate or the other walls of the container being able to be vibrated at a frequency and an amplitude suitable to give liquid or paste droplets of the required dimensions. It is equally possible to use other sub-dividing devices, for example a device which allows the mixture to be centrifuged, with heating facilities if needed, of production of a gas current allowing droplet separation, etc.

In the second alternative method case, in addition to the subdivision methods mentioned above, it is also possible, after extrusion of the liquid or pasty mix through one or several nozzles, in such a way as to form a corresponding number of liquid or pasty threads, to solidify these threads by cooling, for example by immersing them in a fluid at low temperature, especially in a liquid gas, particularly in liquid air, or liquid nitrogen and then crushing or otherwise subdividing the solid and fragile filaments so obtained, while maintaining them at a sufficiently low temperature during this latter operation, and sieving the particles resulting from this subdivision to obtain the required particle size.

Then the particles having a size corresponding to the required spherical beads are subjected to the process steps, conforming to the second manner of proceeding for this latter process which follows the droplet formation of the mixture. Particles which are too large are recrushed. The temperature of these particles which are too small is raised in such a way that they redevelop a pasty consistency, and they are then recycled in the filament production device.

Variations of this latter method of subdividing the mixture, include suppressing the initial extrusion while in the pasty state and crushing and/or grinding blocks of the cooled hardened mix, whatever their shape.

The droplet formation methods which have just been described have the advantage of allowing easy formation of calibrated particles in a narrow grain size range which can be easily varied, and which permit a larger production rate than droplet formation from the pasty state, when the viscosity of the latter is greater than a certain value.

It is clear that each of the methods of droplet formation described above can be combined at will either by using a fixed bed of powdered material or by using a "vibrated" bed.

It is to be noted that the use of a "vibrated" bed of powdered material has the advantage, as compared with a fixed bed, of allowing the preparation of spherical polymer beads having diameters up to the order of 1 cm due to the fact that collapse of the particles while in the pasty state, before hardening of the resin, is prevented by the movements to which the particles are subjected by the vibrations of the bed. On the contrary, in the case when a fixed bed is used, the dimensions of the spherical beads which can finally be obtained have a lower upper-limit, in general 5 to 6 mm, which depends on the surface tension and specific mass of the mix.

The use of such a vibrated bed also has the advantage, as compared with a fixed bed, of allowing a higher production rate for a given surface area of the bed of powdered material.

Moreover, the operation of placing the particles on the bed of powdered material is simplified, in the case of a vibrated bed, by the fact that the vibrations of the bed prevent the particles from sticking together and that no special precautions have to be taken to avoid inter-particle contact.

When droplets of the mixture are formed in the liquid or pasty state and a fixed bed is used, the droplets only sink slightly into the bed. By contrast when a vibrated bed is used the droplets are instantaneously covered with powder over all their surface on falling into the bed and because of this do not stick either to the walls of the vessel containing the bed of powdered material, or to other droplets already present in the bed.

By preference, heat treatment conditions for the particles especially the speed and duration of heating, are chosen in such a way that the viscosity of the mixture, and its rate of increase, which results mainly from resin polymerisation, and the speed of production and/or expansion of the gas supplied by the expansion agent, are mutually compatible, resulting in cellular spherical beads having the required characteristics.

To this end it is possible to set aside the pasty mixture, for a variable length of time, before expansion and before or after the droplet formation.

Thus, for example, in the second method of proceeding it is possible to introduce the particles into a bed of powdered material which is initially at a temperature lower than that which is necessary to cause expansion of the particles under the action of the expansion agent, and then to raise the temperature of the bed of powdered material, at a suitable rate. It is equally possible to use several beds of powdered material, having different temperatures, and to transfer the particles from one bed to another, in the direction of increasing temperature, gradually advancing, expanding and hardening the spherical beads. For example, it is possible after having held the particles in a first bed of powdered material at a temperature and for a length of time sufficient to cause their complete expansion or the start of this expansion, but not long enough to completely harden them, to separate the particles from the first bed, for example by sieving and to put them on another bed, maintained at a higher temperature than the first bed, to finish, if need be, their expansion and to cause them to harden. By preference, even if a fixed first bed is used, one or several "vibrated" beds are used to follow. Of course, it is possible to use a single bed, having a long shape, vibrated with such a movement that the particles are gradually carried during their expansion into various regions having different temperatures, for example, increasing temperatures following a thermal profile corresponding to the thermal treatment to be effected.

The thermal treatment of the particles is carried out in a similar manner whether the particles are formed from the solid or from a liquid or pasty state. In the first of these cases the first stage of heating merely causes softening of the solid particles before they start to expand in such a way that, under the effect of surface tension and possibly of the vibratory movements of the bed, these particles become spherical in shape.

It is possible to carry out all or part of the procedures which have just been described in either a discontinuous or in a continuous way. In this latter case, it is especially possible to recycle the bed of inert, powdered material following the second method of proceeding.

This invention then concerns the use of the spherical beads then organic macromolecular material as described and obtained above, for the fabrication of cellular spherical carbon beads by carbonizing the resultant macromolecular polymeric beads by heating in a substantially non-oxidizing atmosphere to temperatures sufficient for carbonization. Suitable non-oxidizing atmospheres include helium argon and nitrogen. Temperatures above 400° C. are carbonizing temperatures but progressive heating from 100° C. to 1200° C. is preferred. The time, at these temperatures, for proper carbonisation is in the order of several hours with the range one to twenty-four hours being preferred.

This use is characterized by the fact that these beads are heated, in a non-oxidising atmosphere, to a temperature and for a length of time sufficient to cause its carbonisation.

By preference the non-oxidising atmosphere used is an inert gas atmosphere, for example nitrogen helium or argon.

By preference heating is carried out in the temperature range starting at about 100° C. and ranging to 1200° C. The temperature is gradually increased as the carbonisation proceeds. The heating time is preferably from 1 to 24 hours.

In the case when the spherical cellular beads of organic macromolecular material consist of a rigid polyurethane foam, it can be advantageous to give the beads an oxidation treatment before carbonisation.

By preference the heating conditions are chosen in such a way as to give, by carbonisation, cellular spherical beads having a carbon content of between 90 and 100% by weight. Such beads in a partially carbonised state, being able to contain some of the corresponding macromolecular polymeric organic material from the cellular, spherical starting-point beads. The proportion of such material, should not exceed about 10% of the total weight of the high carbon content beads finally obtained.

Such spherical, cellular, high carbon content beads can be used in situations analagous to spherical cellular beads of organic, macromolecular material, but however, the cellular high carbon content beads have advantages as compared with the cellular beads of organic macromolecular material.

In particular, in such uses as insulating layers for baths of chemical products and as inert filter material, the high carbon content beads are chemically more inert than the beads of macromolecular material.

In addition, the high carbon content beads can be used in certain situations in which the use of beads of macromolecular material would be inappropriate. For example, the spherical, cellular, high carbon content beads can be used in the fabrication of a composite material formed of a metallic matrix containing cellular, spherical, high carbon content beads which conform with this invention. This latter use has been described in the Swiss Pat. No. 515,195; its equivalent is U.S. Pat. No. 3,902,861 issued on September 1975. Similarly they can be used as catalyst supports for the various catalytically active oxides and metals used as chemical reaction catalysts.

The invention will be specifically described in the appended Examples. These are merely illustrative of the preferred means and modes and materials to be used and which result from this invention. All art recognized equivalents are intended to be included.

EXAMPLE 1

A mixture of the following composition is prepared:

| | |
|---|---|
| Phenoplast resin in the stage "resol" produced by condensation, in the presence of a basic catalyst, of phenol and formaldehyde, in approximately equimolecular proportions, having a density of 1.245 to 1.255 and a viscosity of 35 to 40 poses at 25° C.: | 50 g |
| Anhydrous ethyl alcohol: | 4.25 cm$^3$ |
| Petroleum ether, having a distillation range between 35 and 70° C.: | 4.25 cm$^3$ |
| Para-toluene-sulphonic acid: | 2.5 g |

The ingredients mentioned above are mixed by energetically stirring for one minute, using a helical stirrer turning at 1,250 revs/min.

Immediately after this procedure, the mixture is poured into a syringe fitted with a piston driven by an electric motor, this syringe, having a capacity of 50 cm$^3$, being connected to a droplet producing device having 24 openings in the form of hollow needles of an inside diameter of 0.3 mm. The rate of thrust of the piston is regulated to give a total flow rate of 0.3 cm$^3$/sec. Thus 8 droplets per second of the viscous mixture are formed, are allowed to fall freely and are collected on a bed of talcum, at ambient temperature, containing particles having a grain size of the order of 5 to 20 microns, this bed having a thickness of the order of 1 cm and being placed about 20 cm below the ends of the needles contained in the droplet producing device, the bed of talcum being subjected to a horizontal, circular vibration of 1 cm amplitude.

The time required to divide all of the mixture into droplets is of the order of 2 to 3 minutes. On all the droplets have been collected in the vibrated bed of talcum the heating of the bed, by means of electrical resistences incorporated in the supporting tray of the bed, is started the rate of heating being controlled in such a way as to reach a temperature of 40° C. in about 6 minutes and 80° C. in 20 to 25 minutes, at the centre of the bed. One can see that once the temperature reaches about 40° C. that the droplets which have started to expand to spheres float to the surface of the bed. The bed is held for 5 to 10 minutes at the maximum temperature of 80° C. such that the total heating time is of the order of 30 minutes. After this the spherical beads so obtained are separated from the bed of talcum by sieving. Thus about 50 g of perfectly hard, pink beads are obtained, having an almost ideal spherical shape, a diameter of the order of 4 mm. and a continuous skin with a thickness of the order of 100 microns surrounding an internal, cellular portion made up of regular cells having a dimension of the order of 40 microns. The volume occupied by these beads is of the order of 500 cm$^3$. The density of each bead is about 0.17 g/cm$^3$. The spherical beads so obtained are carbonized in the following manner:

Under an atmosphere of nitrogen the spherical beads are heated from 100° C. to 1000° C. in 12 hours.

Spherical, cellular beads of glassy carbon, having a carbon content close to 100%, are obtained, which have an average diameter of the order of 3.2 mm. and a density of the order of 0.18 g/cm$^3$. The average dimension of the cells of such high carbon content beads is of the order of 30 microns.

EXAMPLE 2

The same procedure as in example 1 is followed, with the same quantity of a mixture of the same composition, but instead of collecting the droplets on a vibrated bed of talcum, they are collected on a fixed bed of talcum, at ambient temperature, having a thickness of 5 mm. and situated at a distance of 20 cm. below the exit point of the droplets. This bed is spread on an immobile, horizontal tray of steel sheet having an area of 0.1 m$^2$. The droplet production device is moved in a horizontal plane, thus keeping a constant free fall distance for the droplets of mixture onto the bed, such as to give 1 droplet per cm$^2$ of bed. Once the tray is completely loaded with droplets it is heated from room temperature to 80° C. in 45 minutes, the temperature being increased approximately linearly. Thus about 35 g of beads are obtained, per square meter of bed, analagous to those obtained in Example 1.

The spherical beads so obtained are then carbonised, using the same procedure as in Example 1.

EXAMPLE 3

A mixture of the following composition is prepared:

| | |
|---|---|
| Phenoplast resin, in the "resol" stage, produced by condensation, in the presence of sodium hydroxide, of phenol and formaldehyde in molecular proportions of 1 : 1 . 1, having a density of 1.2 and a viscosity of 100 poises at 25° C. (in the form of a mixture containing 10% by weight of methanol): | 100 g |
| A surface active agent (condensation product of an anhydrosorbitol monopalmitat and ethylene oxide): | 2 g |
| Oxalic acid: | 4.5 g |
| Distilled water: | 2 cm$^3$ |
| Petroleum ether, having a distillation range between 35 and 70° C.: | 8 cm$^3$ |

The above ingredients are mixed by energetically stirring for one minute, using a helical stirrer turning at 1,250 revs/min. After this, 2 cm$^3$ of methanol and 5 g of para-toluene-sulphonic acid are added to the mixture so obtained and the whole mixed for a further 1 minute using the same stirrer. A pasty, homogeneous mixture is obtained which is then treated with the same procedures as those in Example 1.

EXAMPLE 4

A mixture of the following composition is prepared:

| | |
|---|---|
| Phenoplast resin, in the "resol" stage, produced by condensation, in the presence of a basic catalyst, of phenol and formaldehyde, in approximately equimolecular proportions, having a density of 1.245 and 1.255 and a viscosity of 35 to 40 poises at 25° C.: | 50 g |
| Petroleum ether having a distillation range between 35 and 70° C.: | 4 cm$^3$ |
| An acid catalyst (a mixture having the following composition in parts by weight an aqueous solution containing 92% $H_2SO_4$ by weight: | 14,2 |
| an aqueous solution containing 84–85% $H_3PO_4$: | 44 |
| distilled water: 41,8): | 6 cm$^3$ |

Before performing the mixing the resin is energetically stirred for two minutes using a helical stirrer turning at 1,250 revs/min., so as to incorporate a certain amount of air. After this the petroleum ether is added and the whole reagitated for one minute, by means of the same stirrer. This mixture is then cooled to a temperature of the order of 1° C., then the catalyst is added and the mixture stirred again for 30 seconds, using the same stirrer.

The viscous mixture so obtained is poured into a syringe of capacity 50 cm$^3$, which is fitted with a piston driven by an electric motor. This syringe is also fitted with an injection needle having a diameter of 1 mm. which allows the viscous mixture to be extruded in the form of a thread of about 1 mm. diameter. This thread falls, as the extrusion proceeds, into a container of liquid air. The thread solidifies instantaneously on contact with the liquid air. The solidified thread so obtained is cut into fragments of about 1 mm. long by means of rotating cutting blades, also submerged in the liquid air container. After chopping all the mixture into solid particles, as just described, these particles of the solid mixture are collected on a metallic grid, having a grid spacing of 1 mm., and previously cooled using solid carbon dioxide ice. The particles of the mixture are then transferred, by shaking the grid, onto a bed of carbon black having a thickness of about 5 mm. and being made up of particles having average dimensions of the order of 0.1 micron, this bed being contained in a metallic tray. About one minute after this latter procedure the metallic tray is placed in an oven warmed to a temperature of 80° C. and is kept in the oven for one hour.

Hence 50 g. of spherical beads of hard phenoplast resin are obtained, being pink in colour and having a "skin" of the order of 100 microns thick, these 50 g. corresponding to a volume of the order of 500 cm$^3$. The grain size distribution of these beads is approximately the following, in weight percent:

| weight percent | diameter ranges (in mm.) |
|---|---|
| 20 | 1 to 3 |
| 30 | 3 to 4 |
| 40 | 4 to 5 |
| 10 | greater than 5 |

These spherical beads are then given the carbonisation treatment described in Example 1.

EXAMPLE 5

A precursor mix of polyurethane is prepared having the following composition (expressed in parts by weight):

| | |
|---|---|
| A polyether being a condensation product of propylene oxide and sorbitol, having a density of 1.094 g/cm$^3$ and a density of 16.000 centistokes at 20° C., a hydroxyl index of 490 mg. of potash and an acid index of 0.1 mg. of potash per gramme. (Product known commercially under the name "Niax Polyol LS-490" and sold by Union Carbide): | 75.0 |
| A polyether being a condensation product of propylene oxide and glycerol, having a density of 1.0223 g/cm$^3$ and a viscosity of 400 centistrokes at 20° C., a hydroxyl index of between 230 and 245 mg. of potash and a maximum acid index 0.05 mg. of potash per gramme. (product known commercially under the name "Niax Polyol LMT-240" and sold by Union Carbide): | 25.0 |
| Expansion agent (CCl$_3$F): | 30.0 |
| Water: | 1.0 |
| Catalyst (N,N-dimethylethanolamine): | 2.2 |
| Catalyst (N,N. N,N'-tetramethylbutanediamine-1,3): | 1.0 |
| Surface active agent (silicone oil being a block copolymer of ethylene oxide, propylene oxide and siloxene, having a viscosity of 1,000 centistokes and a density of 1.053 g/cm$^3$ at 25° C. and a freezing point of 10° C. (Product known commercially under the name "Silicone Surfactant L-5340" and sold by Union Carbide): | 1.5 |
| Diphenylmethane-diisocyanate | 128.0 |

This is performed by rapidly introducing the above ingredients, in the order indicated, into a container furnished with a helical stirrer turning at 1,250 revs/min., and stirring is continued for 30 seconds after all the components have been added. After this an equal weight of polymerised polyfurfuryl alcohol is added to the creamy mixture so obtained, without stopping the stirring. The resulting pasty mixture is then subjected, without any pause, to the procedures described in Example 1, the carbonisation of the spherical beads of resin being carried out in 17 hours.

It is to be noted that the spherical, high carbon content beads finally obtained have a mass and a volume equal to 50% of those of the starting spherical beads of resin. Their density is therefore the same.

EXAMPLE 6

A precursor mix of polyurethane is prepared as indicated in the previous example, having the same composition as that indicated in this latter example, without adding the polymerised furfuryl alcohol. Using this mixture cellular, spherical beads of polyurethane are formed using a procedure analagous to that described in Example 1.

The cellular, spherical beads so obtained are then heated in air, firstly for 24 hours at 150° C. and then for 24 hours at 250° C., and are then given a carbonisation treatment as described in Example 1.

The spherical, high carbon content beads finally obtained have a mass equal to 45%, and a volume corresponding to 40%, of those of the spherical polyurethane beads subjected to the carbonisation.

EXAMPLE 7

A mixture is prepared having a composition identical to the mixture whose preparation is indicated in example 4. Droplets of this mixture are formed by causing it to flow through a plurality of holes, having a diameter of 0.5 mm, bored through the base of a container which is situated at the top of a tower which consists of a top section of 30 cm diameter and one meter height, and of a major bottom section of 2 meters diameter and 10 meters height.

In the top section of the tower the droplets are heated by means of a microwave generator, of 3 KW power, which causes the almost complete expansion to spherical beands of the droplets during their fall in this part of the tower. In the major part of the tower an ascending current of air having a temperature of 150° C. and a speed of 2 meters per second is introduced. This warm current of air slows down the fall of the spherical beads, to give a falling time of the order of 20 seconds, finishes the expansion of the spherical beads and hardens them.

The spherical, cellular beads of phenoplast resin so obtained are used for the fabrication, by carbonisation, of spherical beads having a high carbon content, on proceeding in the same manner as described in Example 1.

EXAMPLE 8

The same procedure is followed as in example 1, using a mixture having the same composition as that described in that example, but injection needles with an interior diameter of 1 mm. are used. Droplets of the viscous mixture are then obtained having an average diameter of the order of 6 mm. and, after expansion of these droplets using the method indicated, cellular spherical bodies having an average diameter of the order of 18 mm. result.

What we claim is:

1. A process for the manufacture of spherical cellular beads of carbon consisting of a plurality of interior and peripheral cells wherein peripheral walls of said peripheral cells form the spherical external surface, said peripheral walls having a thickness of between 50–500 microns, said bead having an internal central part confined within said peripheral walls comprising cells with approximately uniform dimensions and surrounded by the peripheral walls in which the dimensions of the cells, as well as the volume fraction they occupy progressively decreases from the inside to the peripheral cells comprising the steps of:
   (a) preparing a mixture which comprises:
      (1) at lease one organic polymer precursor material, which is capable of being transformed into a rigid thermoset polymer which is selected from the group consisting of phenoplast resins, thermoset polyurethane resins, and mixtures of polymers of furfuryl alcohol and polyurethane resins; and
      (2) dividing this mixture into particles;
   (c) introducing and suspending the particles in a fluidized bed comprising at least one pulverulent inert solid material, the bed being subjected to an agitating motion, while the suspended particles are prevented from touching one another by said pulverulent material;

(d) heating the separated particles in the bed for a period of time in the order of 30 minutes so as to cause liberation of expansion gases to effect their expansion at a rate to form individual spherical cellular beads with non-coalesced cells internal of the beads in which the volume fraction the internal cells occupy progressively decreases from the inside to the peripheral cells with peripheral walls of a thickness between 50–500 microns and through which the expansion gases are vented and said heating effecting hardening of the beads while still separated one from another; and then (e) carbonizing said hardened beads by progressively heating to a temperature lying between 1000° C. and 1200° C., for a time comprising between 1 and 24 hours, under a nonoxidizing atmosphere to form said spherical cellular beads of carbon and while carbonizing venting gaseous materials therein through said peripheral walls and the beads remain intact.

2. The process according to claim 1, wherein said organic material has a residue on carbonization which is at least 15 weight percent of its original mass.

3. The process according to claim 1, wherein at least one surface active agent is included in the mixture.

4. The process according to claim 1, wherein at least one resin hardening catalyst is included in the mixture.

5. The process according to claim 4, wherein the said hardening catalyst is selected from the group consisting of at least one of the following acids: hydrochloric acid, sulphuric acid, phosphoric acid, para-toluene-sulphonic acid, oxalic acid and citric acid.

6. The process according to claim 1, wherein at least one inert, powdered filler material is included in the mixture.

7. The process according to claim 6, wherein the said insert material is silica powder or carbon black.

8. The process according to claim 1, wherein the particles are expanded at or above atmospheric pressure.

9. The process according to claim 1, wherein the particles are expanded at a pressure less than atmospheric pressure.

10. A spherical carbon bead prepared by the process of claim 1.

* * * * *